Sept. 20, 1971 P. HRINKO, JR 3,606,304
MATERIAL SEPARATION DEVICES AND METHODS
Filed May 2, 1969 4 Sheets-Sheet 1

WITNESS:
Patrick McDonnell

INVENTOR.
Peter Hrinko Jr.
BY
Marshall J. Brown
ATTORNEY

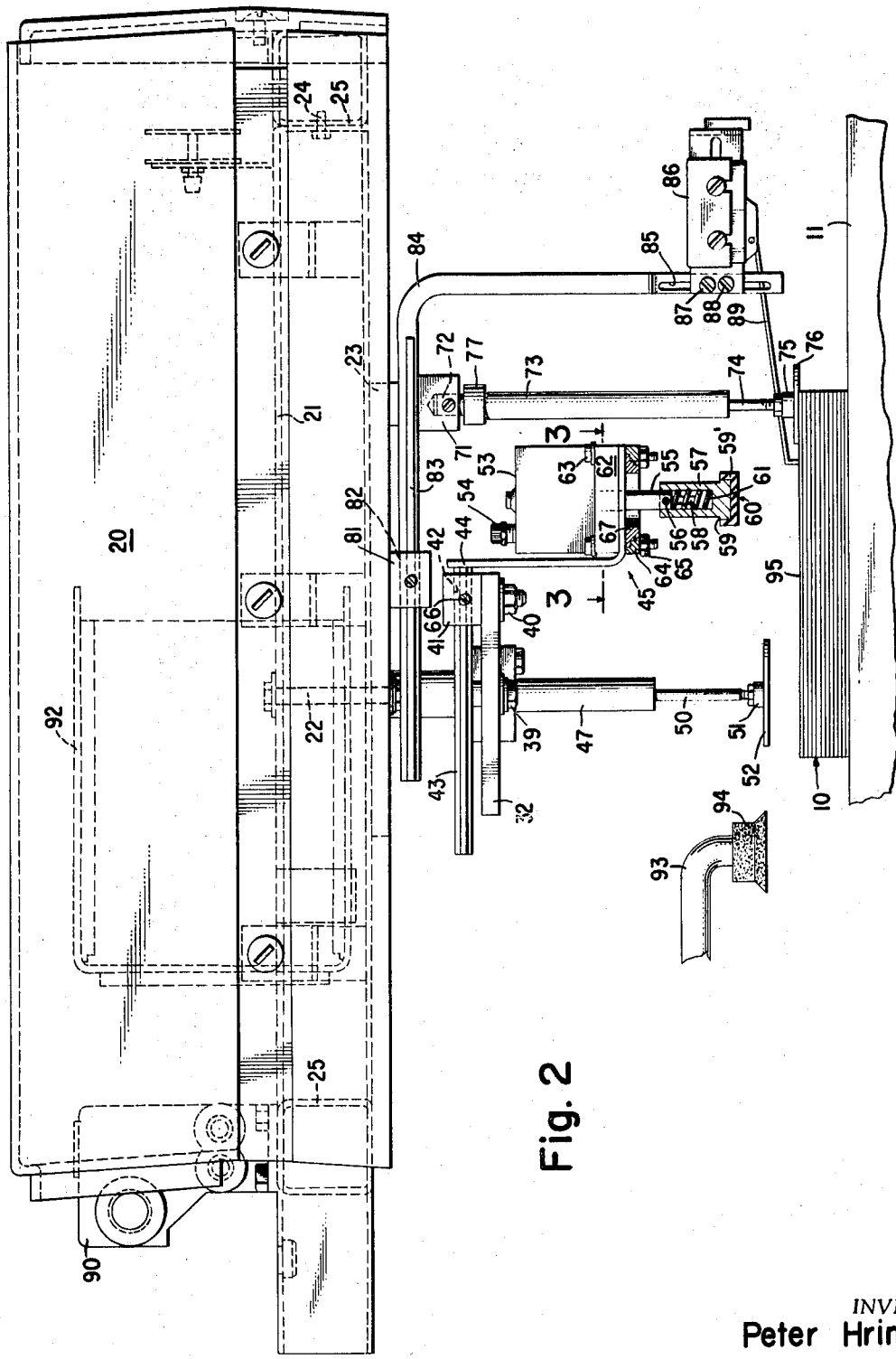

Sept. 20, 1971  P. HRINKO, JR  3,606,304
MATERIAL SEPARATION DEVICES AND METHODS
Filed May 2, 1969  4 Sheets-Sheet 4

*INVENTOR.*
Peter Hrinko Jr.
BY
*Marshall J. Breen*
ATTORNEY

WITNESS:
Patrick McDonnell

United States Patent Office 3,606,304
Patented Sept. 20, 1971

3,606,304
MATERIAL SEPARATION DEVICES AND METHODS
Peter Hrinko, Jr., Fairlawn, N.J., assignor to The Singer Company, New York, N.Y.
Filed May 2, 1969, Ser. No. 821,190
Int. Cl. B65h 3/02
U.S. Cl. 271—21          5 Claims

ABSTRACT OF THE DISCLOSURE

A method and apparatus for separating fabric material in seriatim from a stack thereof by a pneumatic rotary actuation unit that is brought into engagement with the top ply of the stack. The unit is rotated through a predetermined angle to break the frictional engagement between the top ply and the one below it and to twist and lift the top ply uncovering the ply of fabric below it. A clamp is pneumatically brought to bear on the stack on all but the top ply to hold the stack firmly. The rotary unit is removed from engagement with the stack and a transfer device carries the separated ply to another station while the clamp remains in place.

BACKGROUND OF THE INVENTION

This invention relates to fabric separating and more particularly, to a method and apparatus for separating fabric work pieces in seriatim from a stack or pile thereof.

Industrial manufacturers of cloth fabric products find it necessary to rapidly and effectively separate and transfer, one at a time, pieces of fabric work material from a stack thereof to stations where various manufacturing operations are performed. Because of the peculiar characteristics of flexible cloth fabrics, such as the tendency of plies of a stack to cling together at their interface and the tendency of the threads at the several ends to entangle, it has been difficult systematically to separate and remove in seriatim each fabric ply from the top of a stack. Prior art mechanisms for separating the top ply include using the suction of a vacuum, but this has been found to give inconsistent results, plies below the top are removed along with the top ply. Other prior art devices direct a blast of air at the stack in order to loosen the top ply for removal, but here also the results have been inconsistent. Applicant's invention overcomes the problems of the prior art by providing a positively acting mechanical unit that effectively and rapidly separates the top ply of a stack from the rest of the stack.

SUMMARY OF THE INVENTION

The primary object of this invention is to separate positively and effectively fabric material in seriatim from a stack thereof.

Another object of this invention is to provide a method and apparatus for separating the plies of a stack of fabric material in seriatim by a positively acting mechanical unit that overcomes the adhesion between the top ply and the succeeding ply and lifts the top ply therefrom so that the top ply may be removed from the stack without disturbing any other ply.

The applicant has found that when the end of a shaft is brought to bear frictionally on the upper surface of the top ply of a stack of fabric goods and the shaft is rotated through a predetermined angle the frictional contact of the shaft with the top ply tends to carry and twist the top ply with the shaft. When this torsion is applied near an edge or corner, the action causes a shearing at the interface of the top ply and the ply below. This also causes a lifting and twirling at the edge and corner about the end of the shaft. The combination of shearing, lifting and twirling effects a separation of the top ply from the stack since the exposed plies below the lifted edge or corner may be clamped and the top ply removed without disturbing any other ply.

This invention therefore provides a rotatable torque separator unit having a surface for engaging the upper face of the top ply of a stack of fabric work material, means to rotate the unit while the surface engages the top ply to twist a section of the top ply thereby causing at least an edge segment of the top ply to shear and lift away from the ply below, and means to clamp the stack on all but the lifted ply near the location of the lifted portion, thus freeing the top ply to be easily removed from the stack.

Still another object of this invention is to twist a portion of the top ply of a stack of fabric material to shear and lift the top ply from the ply below and then to clamp the stack on all but the lifted top ply, so that only the top ply may be removed in seriatim from the stack.

These and other objects will become apparent as the description proceeds.

BRIEF DESCRIPTION OF THE DRAWINGS

For a fuller understanding of the nature and objects of the invention, reference should be had to the following description taken in connection with the accompanying drawings, in which:

FIG. 2 is a side view of the apparatus of FIG. 1 with the torque separator assembly partially in section and with the fabric support table broken off, and showing a portion of the transfer device;

FIG. 5 is a diagrammatic end view, FIGS. 6, 8, 10 and 11 are diagrammatic side views; FIGS. 7 and 9 are diagrammatic top views taken respectively substantially along line 7—7 of FIG. 6 and line 9—9 of FIG. 8.

DESCRIPTION OF PREFERRED EMBODIMENT

Figure 1:
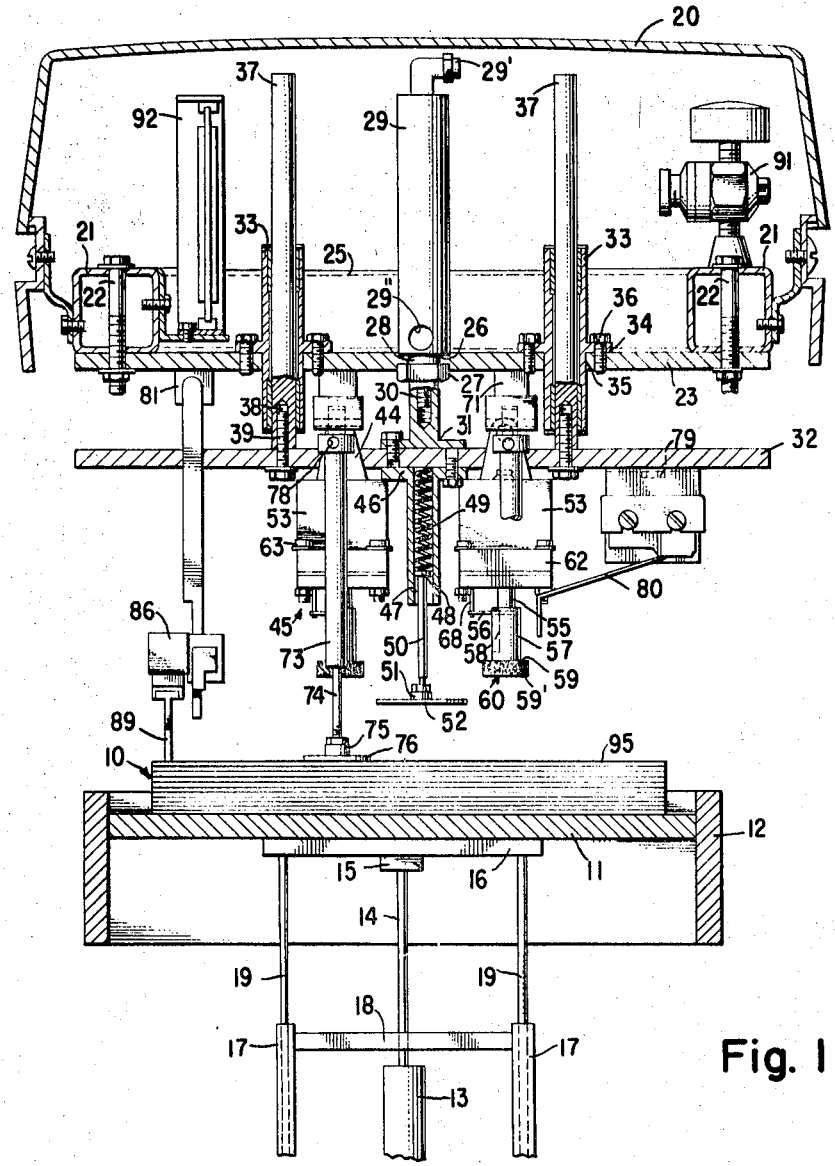
FIG. 1 is an end view of the apparatus of this invention partially in section with the end cover plate removed and the fabric support table piston-cylinder assembly and supports broken off.

Referring to the drawings and particularly FIGS. 1 and 2, there is seen a preferred embodiment of the material separation device constructed in accordance with the present invention. A stack or pile of fabric, generally indicated as 10, is supported on table 11 within a base 12 of the separation module. The table can be raised or lowered by means of an hydraulic or pneumatic piston-cylinder assembly 13 driving a piston rod 14 which is connected to a collar 15 of a table supporting block 16. The cylinder is supported in a frame comprising four vertical brackets 17 (only two of which are shown), and four cross brackets 18 (only one of which is shown) interconnected to form a rigid structure. Suitably journaled within each vertical bracket 17 is a support and guide rod 19, the upper end of which is connected to the support block 16.

Above the table supported within a cover 20 from hollow rectangular beams 21 by bolts 22 is a stationary platform 23. The beams 21 extend substantially parallel to and longitudinally of the table 11 and are connected by screws 24 to similar hollow rectangular beams 25 which extend transverse to the beams 21. Together the beams 21 and 25 form the frame of the separating device or machine. The frame is supported by a vertical standard (not shown) from the base of the separation module.

Figure 12:
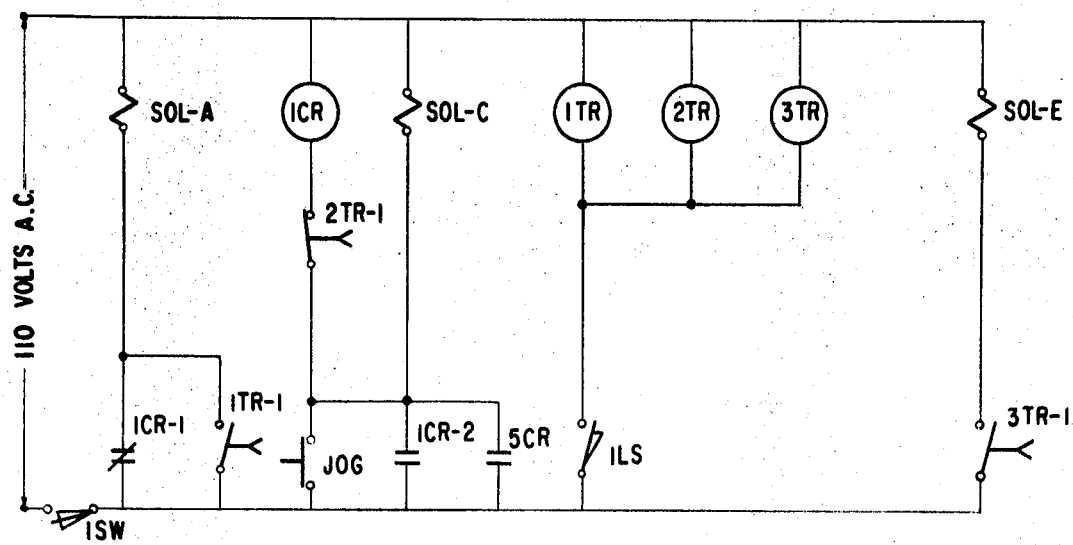
FIG. 12 is an across-the-line electrical wiring schematic diagram of a typical circuit for the apparatus of this invention to automatically perform the sequence of operation of FIGS. 5 to 11.

Passing through an opening 26 in the stationary platform 23 and secured thereto by a nut 27 threaded thereon is a stepped portion 28 of a double acting pneumatic piston-cylinder assembly 29. A piston rod 30 of the piston-cylinder assembly is threaded into a flanged member 31 which in turn is bolted to the top of a movable platform 32. A pair of guide bushings 33 having a flange 34 pass through an aperture 35 in the stationary platform 23 and are secured thereto by screws 36 in the flange 34. A guide rod 37 is vertically slidable within each guide bushing. A bolt 39 passing through the movable platform 32 is threaded into a hole 30 in the lower end of each guide rod to secure the guide rods to the movable platform. It is thus clear that actuation of the double acting piston-cylinder 29 by supplying high pressure air to either port 29' or port 29" causes the movable platform 32 to either descend or ascend respectively. A pair of solenoid valves, shown schematically as SOL C in FIG. 12, act to pass high pressure air from a source (not shown) to either port 29' or 29". One of the valves is normally open to allow air to flow to port 29" and thus maintain the movable platform in the uppermost position; the other valve being normally closed acts, when excited to open, to allow air to flow to port 29' and thus drive the platform down. The two valves act together, one opening when the other closes and vice versa.

Secured to the movable platform 32, as by bolts 40, are a pair of support blocks 41 (only one of which is shown) each having an aperture 42 extending therethrough for slidably receiving a rod 43. One end of each rod is fixed to a bent bracket 44 to which is secured a rotatable torque separator assembly, indicated generally as 45, as more fully described herein. Also secured to the movable platform 32 at its underside is a flange 46 of a hollow cylinder 47 having a disk 48 biased by a spring 49 therein. At its upper end a stem 50 is fixed to the disk 48. The lower end of the stem is threaded into a collar 51 which is formed on a stripper plate 52. Manual rotation of the collar allows relative adjustment of the stripper plate due to the threaded connection. As will be more clearly understood later, the stripper plate acts as a clamp to hold the stack at a location remote from the edge to be displaced so as to limit displacement to said edge, while the rotatable units are twisting. The stripper plate engages the top ply before the rotatable units as the platform descends and remains in engagement therewith after removal of the units as the platform ascends, it thus also acts to knock off the separated fabric from the rotatable units after separation is completed.

Each torque separator assembly 45, as can be clearly seen in FIG. 2, comprises a pneumatic rotary actuator 53 having a pair of ports 54, 54' and a shaft 55 extending from the bottom thereof. The actuator is commonly available on the market and its internal structure forms no part of the present invention. The external shaft 55 is rotated in either direction depending upon which port 54, 54' is supplied with pressurized air. A pair of solenoid valves, shown schematically as SOL E in FIG. 12, act to pass pressurized air from a source (not shown) to one or the other of the ports of each rotary actuator to operate both actuators simultaneously. One of the solenoid valves is normally open allowing air to pass to one of the two ports of each actuator, thus rotating the actuator shaft through a predetermined angle in one direction; when excited this valve closes to stop the air flow. The other valve is normally closed and when excited opens to allow air to flow to the second of the two ports to rotate the actuator shaft through the predetermined angle in the opposite direction. The two valves act together, one opening when the other closes, and vice versa. The connections between the ports and the valves determines the actual and relative direction of rotation of each actuator shaft. The actuator shafts may rotate in the same direction, clockwise or counterclockwise, or they may rotate in opposite directions. The preferred direction of rotation has been found to depend on the material being separated, the location of the actuator relative to the fabric and other factors. This invention is not limited to any specific direction.

Connected by a pin 56 to the free lower end of each shaft 55 so as to rotate therewith is a hollow flanged cylinder 57 having its axis of rotation substantially perpendicular to the top surface of the stack. The cylinders include diametrically opposed vertical slots 58 on the side thereof along which the pin can travel, but the pin is constrained against lateral movement. The lower flanged end 59 of the cylinder 47 acts, when rotated, as a fabric twister and separator. The separation action is effected by the frictional twisting of the top ply of the stack. When both cylinders are simultaneously rotated in opposite directions while in contact with the top ply, a lifting of an entire edge of the ply is effected as is clearly seen in FIG. 4. To increase the frictional contact with the fabric, a rubber coating 59' is vulcanized onto the end 59 of the cylinder. The twister assembly designated as 60 can be either coated or uncoated; it is understood that more effective performance is obtained if a coating is utilized. A spring 61 acts to bias the cylinder 57 downward against the top ply of the stack 10 and allows relative movement between the twister cylinder and the shaft 55 to ensure proper contact between the twister and the top ply. The actuator 53 has a rectangular base portion 62 having holes through which bolts 63 extend. The bolts 63 further extend through the bracket 44 and thence into a block 64 to be secured by nuts 65. The entire unit 45 can be shifted laterally relative to the stack 10 by means of rod 43 sliding in block 41 and the unit can be secured at a selected position by set screw 66 in the block 41.

Figure 3:
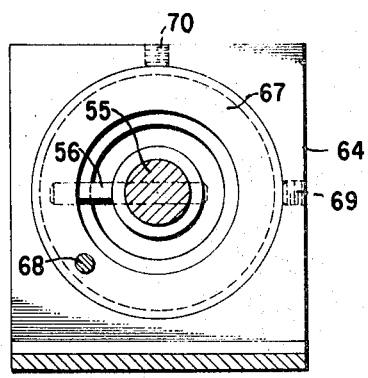
FIG. 3 is an enlarged cross sectional view of the torque separator assembly taken substantially along line 3—3 of FIG. 2.

Journaled within the block 64 for manual rotation is a disk 67. A stop pin 68 is secured to the disk and projects downward therefrom to limit the extent of rotation of the twister by stopping the rotational travel of pin 56. The disk 67 can be fixed at the desired position by set screws 67 and 70, as seen in FIG. 3. The rotary actuators have a maximum angle of rotation of approximately 90 degrees and the top pin 68 thus allows adjustment of the angle of rotation of the twister between zero and approximately 90 degrees. In this manner, the optimum angle of rotation for separation of a given fabric can be selected within these limits.

Attached to the stationary platform 23 in any suitable manner are a pair of stepped support brackets 71 into each of which is fixed the upper end 72 of an elongated pneumatic piston-cylinder assembly 73. Within each assembly 73 a piston (not shown) is connected to a rod 74 which extends out of the cylinder at its lower end. The lower end of the rod 74 is threaded into a collar 75 formed on a clamp plate 76. The relative position of the clamp 76 to the stack 10 can be adjusted by manually turning the collar. Near the upper end of the cylinder 73 a sleeve 77 having an air port 78 is threaded onto the cylinder. The port 78 is in registration with the central portion of the cylinder and is connected to a pneumatic source (not shown) through a solenoid valve shown schematically in FIG. 12, as SOL A. Within cylinder 73 a spring (not shown) acts to bias the clamp away from the stack 10. The valve SOL A is normally closed and when excited allows air to be pumped into each cylinder 73 and drive the clamps onto the fabric pile.

Secured as by bolt 79 to the movable platform 32 so as to move therewith is a limit switch assembly 1LS having a sensor 80 operatively connected thereto. When the movable platform is lowered such that the twisters 60 are on the stack of fabric, the sensor 80 is also thereon and the limit switch 1LS initiates the separation sequence as will be described herein.

Attached to the stationary platform 23 is a support block 81 having an aperture 82 extending therethrough for slidably receiving a rod 83. The rod is bent down vertically at 84 and at the lower end thereof has an elongated slot 85. A limit switch assembly 86 is connected to the rod by means of a pair of screws 87, 88 and is vertically adjustable within the slot 85. A sensor 89 which rests on the top of the stack, senses the height of the stack and through electrical circuitry (not shown) can actuate a solenoid valve allowing air or hydraulic fluid to flow to the piston-cylinder 13, thus raising the table 11 to the appropriate level for the clamps 76 and the twisters 60 to properly set thereon. It is therefore apparent that after initially adjusting the height of the table 11 and the sensor 89 relative to the stack of fabric, the clamps and twister, the separation device operates automatically without any further manual adjustments for changes in the height of the stack as each ply is successively separated and withdrawn, as will be further described herein.

Mounted on one of the transverse beams 25 is a bank of solenoid valves 90 comprising the five valves envisioned for the movable platform, the rotary actuators and the clamps. Pressure regulators 91 may be used for controlling the air pressure to the solenoids in the usual manner. The amount of pressure required depends to some extent on the type of material to be separated and other factors. The required electrical circuitry, which may include printed circuitry, can be conveniently placed within a housing 92 on the frame. It is thus seen that the separation device is a self contained module that can be used by itself or with other modules comprising a complete material handling system.

Inasmuch as it is preferred to use the separation module in conjunction with a transportation module, the operation of the apparatus will be described in conjunction with a transporting or transfer device. One such arrangement is partially shown in FIG. 2 as comprising a rigid tube 93 having a work contacting head 94. The tube can be moved by means (not shown) between work stations. Vacuum means (not shown) is applied to the tube 93 to create a suction at the head 94 such that when the head contacts a separated fabric ply it can lift the ply from the stack. The transfer device may then retract from the stack carrying the fabric ply with it to be deposited at another station for further operations thereon.

Operation

Figure 5:
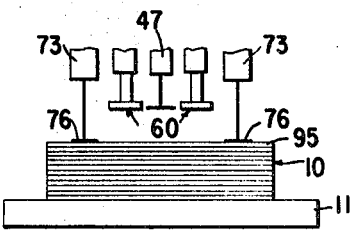
FIGS. 5 to 11 inclusive illustrate diagrammatic representations of the sequence of operation of the method and apparatus of the invention.
Figure 6:
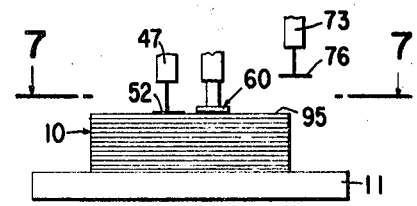

Referring to FIGS. 5-12, the method of operation of the separation unit will now be described. Actuation of switch 1SW locks in the line power to the logic circuit. This energizes the pile clamp solenoid valve SOL-A bringing the clamps 76 to bear on the top of the stack 10 as shown in FIG. 5. Operation of a manual JOG switch, or preferably a relay contact 5CR in the transfer device electrical circuit, which is triggered at some predetermined location of the transfer device head 94, energizes relay 1CR. The normally closed contact 1CR-1 associated with relay 1CR opens to remove power from SOL-A thus retracting the pile clamps 76 while the normally open contact 1CR-2 of relay 1CR closes to lock-in power to the solenoids SOL-C associated with the movable platform 32, thus bringing the platform down such that the twisters 60 frictionally bear on the top of the stack as shown in FIG. 6. When the twister and the stripper plate 52 reach the top surface of the stack 10, limit switch 1LS is closed by sensor 81 contacting the stack, thus energizing on-delay type time delay relays 1TR, 2TR and 3TR.

Figure 7:
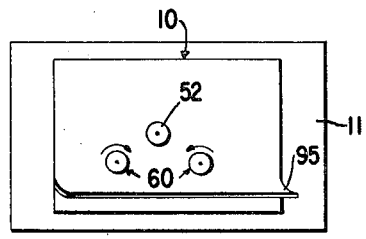

Time delay 3TR times out first causing its normally open contact 3TR-1 to close. This energizes the rotary actuator solenoids SOL-E which causes the twisters 60 to rotate through their prescribed angle and to maintain that rotated position, thus causing the top ply 95 to lift from the stack as shown in FIG. 7. The twisters 60 are shown rotating in opposite directions, but as previously stated the directions depend on various factors.

Figure 4:
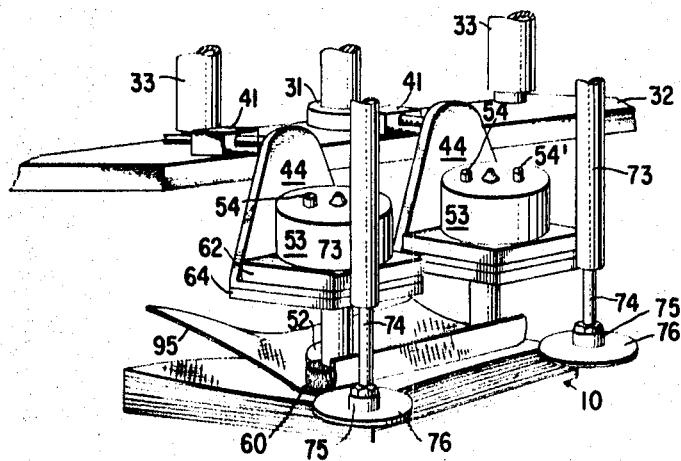
FIG. 4 is a perspective view of the separating instrumentalities of this invention after the torque separators have lifted an edge of the top ply of the stack and the clamps have returned to clamp the stack on all but the lifted ply.
Figure 8:
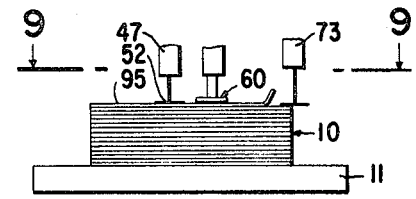

While the twister rotation is maintained, time delay relay 1TR next times out and closes its normally open contact 1TR-1, thus re-energizing clamp solenoid SOL-A which brings the clamps to bear on the stack 10 below the lifted top ply, as shown in FIGS. 8 and 4.

Figure 9:
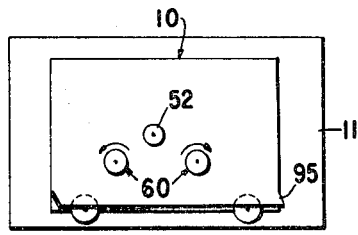

The time delay relay 2TR next times out causing its normally closed contact 2TR-1 to open removing power from relay 1CR. Thus, contact 1CR-1 is reclosed to maintain the clamps against the stack. Also contact 1CR-2 is reopened and at about this time relay 5CR is reopened by the transfer device as it begins its movement toward the separation module. Power is therefore removed from the movable platform solenoids SOL-C and the platform 32 rises. As the platform moves from the stack switch 1LS reopens and immediately returns the time delay relay 1TR, 2TR, and 3TR and their contacts 1TR-1, 2TR-1, and 3TR-1 to their initial states. Power is thus removed from the rotary actuator solenoids SOL-E causing the twisters to rotate back to their initial position as shown in FIGS. 9 and 10.

Figure 10:
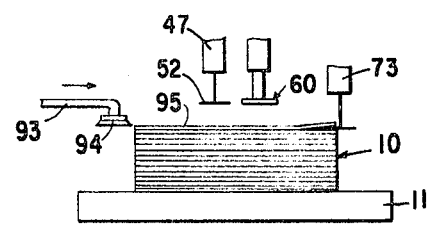
Figure 11:
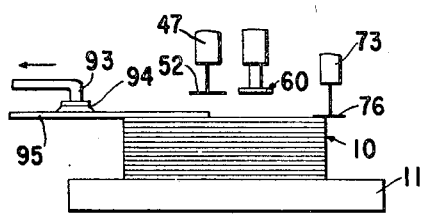

The transfer device moves in from the left as shown in FIG. 10 and the work contacting suction head 94 picks up the separated ply 95 and carries it away to another work station, FIG. 11. The cycle is now in the condition of FIG. 5 and a new cycle can be initiated and the entire sequence is repeated.

While the invention has been described with reference to the structure disclosed herein, it is not confined to the details set forth. The number of stack clamps and the number of twisters are dependent upon the size of the work being separated, the wider the work, the more clamps and twisters that are required. Other such details set forth similarly should not be considered as limiting this invention which is intended to cover such modifications or changes as may come within the scope of the following claims.

What I claim herein is:

1. A method of separating the top ply in seriatim from a stack of flexible fabric plies comprising the steps of engaging the top ply with a plurality of rotatable friction surfaces, each surface having an axis of rotation intersecting the respective friction surface and the top ply, rotating at least two of said friction surfaces in opposite directions about their respective axis of rotation to displace an edge of said ply from a corresponding edge of the stack, clamping all but the top ply of said stack at the locale of the displaced edge, disengaging each friction surface from the top ply, and removing the top ply from the clamped stack.

2. Apparatus for separating the top ply in seriatim from a stack of flexible fabric plies comprising a frame, a plurality of high friction surfaces operatively carried by said frame and disposed for engagement with said top ply, each of said surfaces having an axis of rotation intersecting the respective friction surface and said top ply, means for relatively moving said friction surfaces and the stack to position said friction surfaces into and out of engagement with said top ply, means for rotating at least two of said friction surfaces in opposite directions about their respective axis a predetermined amount when the friction surfaces are in engagement with the top ply to displace an edge of sadi top ply from the remainder of the stack, and means for selectively clamping the remainder of the stack at the locale of the displaced edge of the top ply.

3. Fabric separating apparatus as recited in claim 2 wherein each axis of rotation is substantially perpendicular to the top surface of said top ply.

4. Apparatus for separating the top ply in seriatim from a stack of flexible fabric plies comprising a frame, a movable platform supported by said frame for movement relative thereto, a plurality of high friction surfaces operatively supported by said movable platform and disposed for engagement with said top ply, each of said surfaces having an axis of rotation intersecting the respective friction surface and the top ply, means for relatively moving said platform and the stack to position said friction surfaces into and out of engagement with the top ply, means for rotating at least two of said friction surfaces in opposite directions about their respective axis a predetermined amount when the friction surfaces are in engagement with the top ply to displace an edge of said top ply from the remainder of the stack, a holding member carried by said movable platform disposed to engage the top ply remote from the edge to be displaced so as to limit the displacement to the displaced edge, said holding member being further disposed in closer proximity than said friction surfaces to said stack when said friction surfaces are out of engagement with said top ply so as to engage the top ply prior to engagement thereof by said friction surfaces when said friction surfaces are moving into engagement with the stack, means for selectively clamping all but the top ply of the stack at the locale of the displaced edge of the top ply, and means for biasing said holding member to remain in engagement with the top ply subsequent to engagement thereof by said friction surfaces when said friction surfaces are moving out of engagement with the stack to thereby aid in disengaging the friction surfaces from the top ply.

5. An apparatus for separating a ply from a stack of flexible fabric plies comprising, a plurality of twisters movable toward and away from engagement with the top ply of the stack, each of said twisters having a high friction surface and having a fixed axis of rotation intersecting said high friction surface and said top ply while said high friction surfaces of said twisters are in engagement with said top ply, means for rotating at least two of said high friction surfaces of said twisters in opposite directions about their respective fixed axis of rotation while in engagement with the top ply to cause one edge of the top ply to be twisted away from a corresponding edge of the stack, clamping means movable toward and away from engagement with said edge of the stack, and control means for sequentially operating the twisters and the clamping means to cause the twisters to operatively engage the top ply of the stack when the clamping means is positioned away from the stack and to cause the clamping means to subsequently clamp all the plies of the stack except the top ply thereof before the twisters disengage the top ply of the stack.

References Cited

UNITED STATES PATENTS

| | | | |
|---|---|---|---|
| 326,124 | 9/1885 | Kneeland | 271—20 |
| 492,218 | 2/1893 | Lux | 271—21 |
| 618,409 | 1/1899 | Gero | 271—28 |
| 645,162 | 3/1900 | Bridgewater | 271—22 |
| 984,417 | 2/1911 | Butterfield | 271—36X |
| 1,025,282 | 5/1912 | Lev | 271—22 |
| 1,285,590 | 11/1918 | Barr | 271—22 |
| 1,559,549 | 11/1925 | Bullock | 271—21 |
| 1,760,119 | 5/1930 | Cross et al. | 271—37 |
| 3,008,709 | 11/1961 | Buslik | 271—10 |
| 3,276,770 | 10/1966 | Griswold | 271—10 |
| 3,442,505 | 5/1969 | Szentkuti | 271—21X |

FOREIGN PATENTS

| | | | |
|---|---|---|---|
| 626,479 | 10/1961 | Italy | 271—21 |

EVON C. BLUNK, Primary Examiner

W. S. CARSON, Assistant Examiner